W. A. HORTON.
GRINDER FOR MOWER SECTIONS.
APPLICATION FILED JULY 13, 1911.
1,010,632.
Patented Dec. 5, 1911.
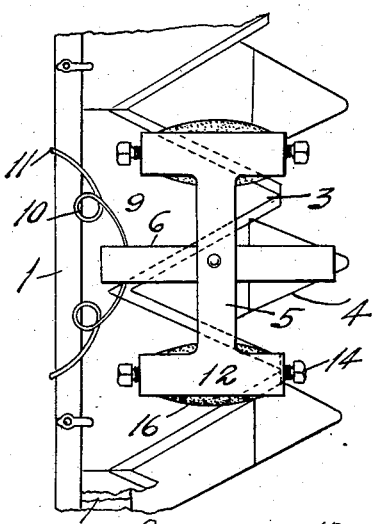
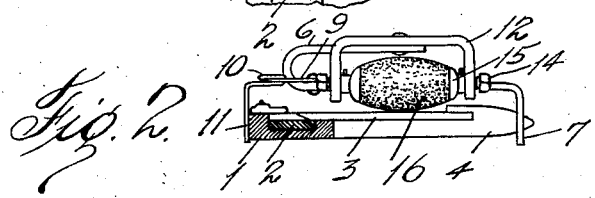
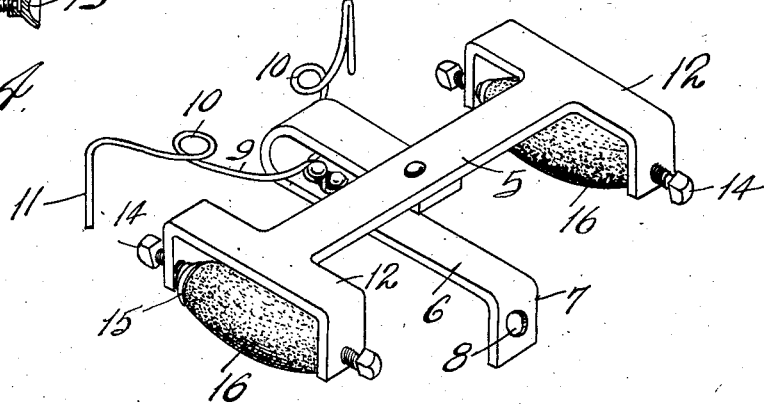
WITNESSES:
J. B. Bowling
W. S. Castle
INVENTOR
W. A. Horton.
BY
Jack A. Schley
ATTORNEY

UNITED STATES PATENT OFFICE.

WILLIAM A. HORTON, OF LINN, OKLAHOMA.

GRINDER FOR MOWER-SECTIONS.

1,010,632. Specification of Letters Patent. Patented Dec. 5, 1911.

Application filed July 13, 1911. Serial No. 638,257.

*To all whom it may concern:*

Be it known that I, WILLIAM A. HORTON, a citizen of the United States, residing at Linn, in the county of Marshall and State of Oklahoma, have invented certain new and useful Improvements in Grinders for Mower-Sections, of which the following is a specification.

This invention relates to grinders for mower sections.

The object of the invention is to provide a grinding or sharpening device which may be attached to the mower and the sections sharpened without removing the cutter from its place.

Another object is to provide a grinding attachment having provision for retaining itself on the mower bar in operative position in a yieldable manner, and also the provision of removable abrading elements and means for fastening the same in position.

A further object of the invention is to provide a device of the character described that will be strong, durable, efficient, simple and comparatively inexpensive to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a plan view of a portion of a mower bar showing the invention in position thereon, Fig. 2 is a transverse sectional view of the same, Fig. 3 is a perspective view of the grinder, and Fig. 4 is a detail of one of the screws and its cap.

In the drawings the numeral 1 designates a mower bar having the cutter bar 2 on which sections 3 are mounted, the latter projecting into the guards 4 in the usual manner.

The invention comprises a supporting bar 5 mounted on the upper side of a horizontal U-shaped spring member 6. The member engages the bar at the central portion and the parts are disposed at right angles to each other. The member 6 has its lower portion extended beyond the bar and provided with a down turned lug 7 having an eye 8. The device is placed on the mower bar so that the bar 5 extends parallel thereto, the lug 7 being engaged over one of the guards 4 so that the eye 8 receives the latter. The bowed portion of the member 6 will thus project rearward over the mower bar.

Within the rear end of the member 6 a spring clamp 9 is secured as is best shown in Fig. 3. This clamp comprises spring arms, each including a coil 10. At the end of each arm a down turned hook 11 is provided. The arms are spread apart and the hooks are engaged over the rear edge of the mower bar. Owing to the resilient nature of clamp arms the device will be properly held in position, but will yield to undue strain.

At each end of the supporting bar 5 hangers 12 are provided and extend at right angles to the said bar, thereby projecting on each side of the bar transversely of the mower bar. In the depending ends of the hangers adjusting screws 14 are mounted. Each screw has a swivel connection with caps 15, there being two caps in each hanger in opposed relation to each other.

Between the caps of each hanger an abrading element 16 is held. This element may be of any suitable material for grinding or sharpening the sections 3. The elements have an elliptical shape in longitudinal section so as to provide oval surfaces. They are held rigidly in the hangers by the screws and caps, but may be removed or replaced by loosening the screws. The elements are supported so as to rest on the sections 3 and be engaged by the cutting edges of the latter. The spring member 6 acts to hold the elements in yieldable engagement with the sections.

After the grinder has been placed in position the mower is set in motion just the same as it is usually used which will reciprocate the sections under the elements 16 and the beveled edges of the sections will thus be ground. By reason of the spring member 6 and the rapid movement of the cutter bar 2, the elements will rebound slightly as one cutting edge of a section passes from under one of the elements; thereby causing the said element to drop onto the opposite cutting edge of said section and not grind the surface of the section between its cutting edge. The grinding is engaged with different guards until all the sections are sharpened. As several sections are ground at the same time it will not be necessary to engage the device with every guard and it has been found that by engaging with every fourth guard satisfactory results may be had. The work is expeditiously executed, it being merely necessary to attach the grinder and start the team.

What I claim, is:

1. In a mower section grinder, a spring member, a down turned lug at one end of the member having an eye, a support mounted on the other end of the member and over the same, hangers secured to the member transversely thereof, abrading elements mounted in the hangers longitudinally thereof, spring clamp arms extending from the member at the end opposite the lug, and hooks provided on the arms.

2. In a mower section grinder, a spring member, a lug mounted at one end of the member and provided with an eye, spring arms projecting from the opposite end of the member and having hook ends, a support mounted upon the member and over the same, hangers depending from the ends of the support, screws mounted in the hangers, caps carried in the hangers by the screws, and abrading elements mounted between the caps.

In testimony whereof I have signed my name to this specification in the presence of two subscribing witnesses.

WILLIAM A. HORTON.

Witnesses:
M. E. FULTZ,
LILLIE V. TILLERSON.

Copies of this patent may be obtained for five cents each, by addressing the "Commissioner of Patents, Washington, D. C."